United States Patent Office 2,754,382
Patented July 10, 1956

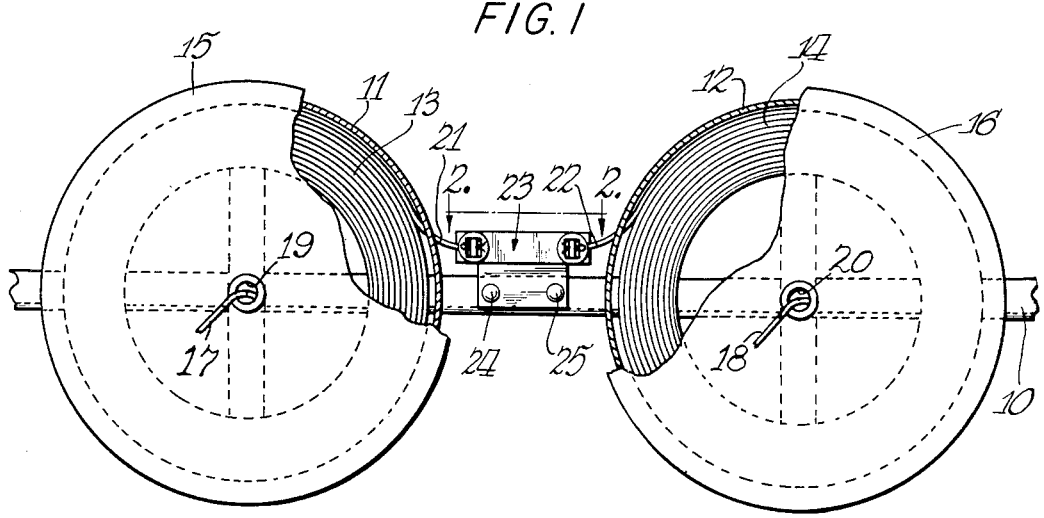
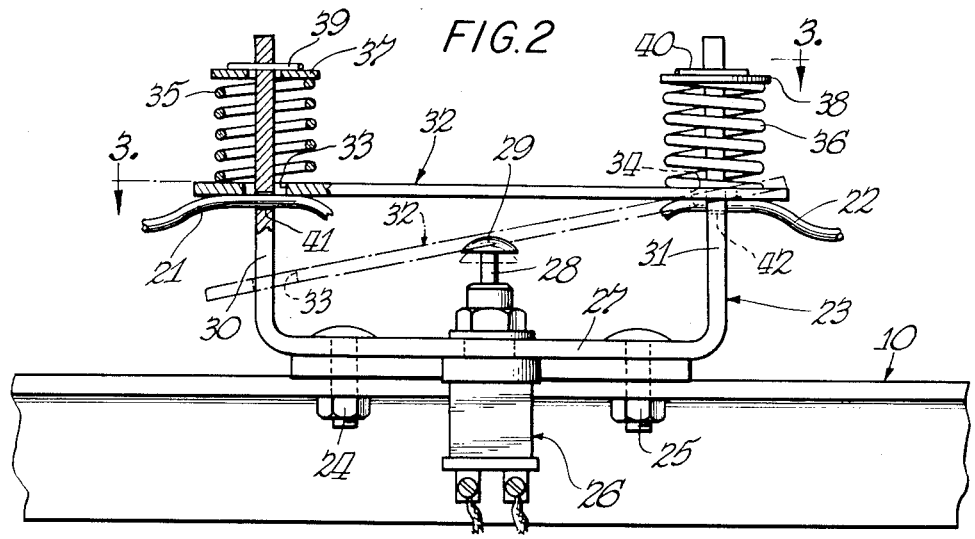
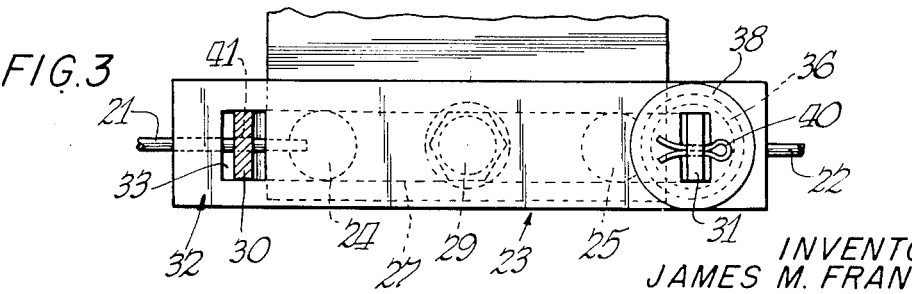
INVENTOR
JAMES M. FRANCIS
ATTY.

2,754,382

ALARM FOR BALERS INDICATING THE SUPPLY OF BALING WIRE IS EXHAUSTED

James M. Francis, Memphis, Tenn., assignor to International Harvester Company, a corporation of New Jersey Application March 18, 1953, Serial No. 343,204

2 Claims. (Cl. 200—61.18)

This invention relates to a new and improved alarm for balers indicating the supply of baling wire is exhausted.

Field traversing hay balers have recently been developed to a stage of almost completely automatic operation requiring but a single operator. This one operator drives the baler pulling tractor through a field of windrowed hay whereupon the baler apparatus picks up the hay from the windrow and feeds it into a bale forming chamber, at which time it is compressed and then tied by encircling one or more strands of tie material therearound and intertwisting or knotting the ends thereof. The bale encircling strand or packaging material is either twine or wire and comes in spools for deposit within regular receptacles on the baler for feeding directly to the tying or twisting mechanism. These tying and twisting mechanisms on the hay balers are pretty well concealed from the operator and it is difficult for the operator to know when the twine or wire supply is exhausted. Generally, the first indication that anything is wrong is when the operator observes that the hay he thought he had baled is dropped untied into the field. Prior to the automatically tied hay bales the machines required the services of several operators who could constantly maintain a watch on the strand supply.

It is, therefore, an important object of this invention to provide alarm means whether visible or audible to indicate to the user of an automatically operable hay baler that one or more of his sources of bale encircling tie strands is exhausted. Another important object of this invention is the provision of means for automatically signaling the operator of a hay baler that the source of baling wire is exhausted.

Still another important object of this invention is to supply an alarm system for use on automatically tying hay balers arranged to operate when the last convolution of a coil of baling wire is withdrawn from the container in which the supply is kept.

Another and still further important object of this invention is to provide an alarm mechanism indicating baling wire termination which eliminates active contact with the continuous length of baling wire used and yet positively signals the last of the wire supply to the operator.

Still another obejct of this invention is to provide an alarm actuating mechanism capable of being operated by either or both of two coils of baling wire whereupon notice of the exhaustion of either of the two baling wire supplies is transmitted to the operator.

Another object of this invention is to equip a baler with trigger means releasable by final use of the source of baling wire and cooperating with any type of alarm mechanism which will draw the attention of the operator of the baler and thus indicating to him that the source of supply of baling wire is exhausted.

Other and further important objects and advantages of this invention will become apparent from the disclosures in the following specification and accompanying drawings.

In the drawings:

Figure 1 is a top plan view of the source of baling wire as used on a hay baler and incorporating the alarm system of this invention;

Figure 2 is a side elevational view partially in section as viewed from the line 2—2 of Figure 1; and Figure 3 is a combination sectional and plan view of the alarm actuating mechanism as viewed on the line 3—3 of Figure 2.

As shown in the drawings, the reference numeral 10 indicates generally a frame supporting structure upon which is mounted spaced apart container members 11 and 12 to receive a coil of baling wire or the like as shown at 13 and 14. Covers 15 and 16 are provided for the containers 11 and 12, respectively, and portions thereof have been broken away in the drawing in order to show the interior with the coils of wire therein.

The baling wire as shown in the coils 13 and 14 is used to encircle a compressed bale of material such as hay and by means of twisting the ends of an encircled strand the compressed bale of hay is maintained in its preformed compressed condition. Generally, the bales or packages of hay or like material are tied with parallel spaced apart encircling strands rather than having a single strand encircling the bale in the center thereof. Thus the side by side containers 11 and 12 providing for separate coils of baling wire 13 and 14 perform the important function of delivering bale encircling strand material to the side by side and somewhat spaced apart encircling bale ties. It should be understood that although the present invention contemplates the use of wire, the invention could be equally applicable to twine so that the operator would be notified when the supply of bale encircling packaging material, whether it be wire or twine, was exhausted. Each coil of baling wire 13 and 14 is provided with two ends. The inner ends 17 and 18, as shown in Figure 1, pass upwardly and out through centrally located openings or guides 19 and 20 in the wire container covers 15 and 16. These wire ends 17 and 18 pass directly to the baling chamber where they are passed around the bale of compressed hay or the like, and by means of a twisting and cutting mechanism the bale is completely tied or packaged with the two side by side strands. The outer ends of the wire coils 13 and 14 are shown at 21 and 22 as they pass outwardly beneath the side walls of the containers 11 and 12. These ends 21 and 22 of the coils of baling wire are the means for actuating the alarm mechanism of this invention. Thus when the ends 21 and 22 are pulled into the containers 11 and 12, respectively, for discharge through the top openings 19 and 20, the operator is immediately advised by means of some alarm mechanism that the wire in one or more of the containers 11 and 12 is exhausted.

As best shown in Figure 2, the alarm actuating mechanism consists of a U-shaped bail-like member 23 which is bolted or otherwise fastened as shown at 24 and 25 to the frame supporting structure 10. An electrical switch 26 is fastened to the bottom or horizontal portion 27 of the bail member 23 and has an upwardly extending vertically reciprocable actuating plunger 28. The plunger 28 has a rounded top or head 29 which may be physically engaged to cause actuation of the electrical switch 26. When the baling wiring in either or both of the containers 11 and 12 is exhausted the switch or, as it will be called, an alarm mechanism is actuated. An electrical switch is shown in the drawing but it should be understood that the alarm mechanism may take any form and that the vertically reciprocating plunger 28 may directly ring a bell or perform any other visible or audible alarm signals and still come within the concept of this invention. The electrical switch has been shown merely to indicate one form of an alarm mechanism. An electrical circuit which has not been shown and which would include this switch 26 could be arranged and constructed to flash a light, ring a buzzer or possibly cut off baler engine ignition in order to draw the attention of the baler operator to the fact that his supply of baling wire needs to be replaced. Thus also the switch may be employed to make or break an electrical circuit as desired.

The U-shaped member 23 in addition to having a flat bottom portion 27 has spaced apart generally parallel upright post members 30 and 31. A cross member 32 which for convenience will be designated a trigger member is provided with openings 33 and 34, which have a spacing identical to the spacing of the posts 30 and 31 whereby the trigger member 32 may be free for vertical sliding movement on the posts of the bail member 23. The apertures 33 and 34 in the trigger member 32 are sufficiently large to permit unrestricted movement of the trigger member 32 up and down the posts 30 and 31 whether it be translational movement with respect to the bail portion 27 or angular movement with respect thereto. Coil springs 35 and 36 are disposed around the post members 30 and 31, respectively, and above the trigger member 32 to supply a spring biasing thereof. Washer members 37 and 38 are held in position above the springs 35 and 36 by means of cotter pins 39 and 40 which pass through openings in the top of the posts 30 and 31. The springs 35 and 36 are thus confined between the trigger member 32 and the washers 37 and 38. These springs are of the extension type and tend to urge the trigger member 32 downwardly into alarm mechanism engaged position. Thus without auxiliary means for maintaining the trigger member 32 spaced above the alarm mechanism, the springs would cause the trigger member to depress the rounded head and integral rod 28 of the alarm actuating mechanism. However, during all normal operation of the hay baler incorporating this invention thereon the trigger member 32 is held from engagement by the presence of a supply of wire in the containers 11 and 12. This is accomplished by inserting the outer ends 21 and 22 of the coils of wire 13 and 14 through apertures 41 and 42 in the posts 30 and 31 of the bail member 23 so that the end portions 21 and 22 of the coils of wire act as locking pins or keys for holding the trigger member spaced above the alarm mechanism, as designated generally by the switch 26.

In operation the hay balers incorporating this alarm actuating mechanism have installed therein coils of baling wire in each of the containers 11 and 12, whereafter the inner ends 17 and 18 of the coils of wire are passed out through the central guide openings 19 and 20 in the tops of the containers and thence threaded through the baler needle and twisting mechanism, not shown. The outer ends 21 and 22 of the coils of wire 13 and 14 are passed beneath the circumferential sides of the containers 11 and 12 and when the trigger member 32 is manually held in an up spring compressed position, the openings 41 and 42 in the bail posts are cleared for passage of these baling wire outer ends 21 and 22. The device is now ready to operate and the user of the hay baler drives his apparatus through a field of windrowed hay, whereupon the hay is picked up, compressed and packaged by encircling a pair of spaced apart wires therearound. The baling operation thus progresses in this manner and, assuming there are no other interruptions, baling may continue until the supply of wire in either of the containers 11 and 12 is exhausted whereupon the alarm mechanism is actuated, serving notice to the user that the baling wire in at least one container is exhausted and requires replenishing. As shown in Figure 2, the full line position of the trigger member 32 is shown in an up spaced apart position from the alarm mechanism 26. In dash line position the trigger member 32 is shown after the end portion 21 of the coil of wire 13 has been stripped from its position in the transverse opening 41 in the post 30, thus permitting the coil spring 35 to be extended and causing a depression of the button 29 of the alarm mechanism. The opening 33 in the trigger member 32 is large enough to permit the dropping of one end of the trigger member 32 without binding on the post 30. The effect of one end only dropping is a hinging about the other spaced apart post. However, it should be understood that either the removal of one or both of the end portions 21 and 22 of the baling wire coils 13 and 14 will cause actuation of the alarm mechanism. In the event only one wire is to be used the one end of the trigger member may be held up by a short pin or the like and the trigger hinged therearound. The alarm of this device is actuated without requiring a constant engagement of an actuator member with the full length of wire in the coil, and thus there is an absence of wearing of parts in the actuating mechanism of this invention inasmuch as the device is entirely stationary without relatively moving parts throughout all of the baler operation until just the very end when the last of the baling wire is pulled from its position beneath the trigger member.

Numerous details of construction may be varied throughout a wide range without departing from the principles disclosed herein and I, therefore, do not propose limting the patent granted hereon otherwise than as necessitated by the appended claims.

What is claimed is:

1. A switching means for actuating an electrical switch including a supporting frame, a switch mounted generally centrally on said supporting frame, spaced apart posts on said supporting frame on each side of said switch, a switch trigger spanning said spaced posts, said trigger having spaced openings therein for loosely journalling on said spaced posts for sliding movement thereon, separate spring means normally urging each end of said switch trigger into electrical switch operating position, said posts having holes therein for passage of the ends of packaging strands, and said packaging strand ends normally holding said switch trigger against electrical switch actuation and whereby when either or both of said strand ends are removed from said holes the switch trigger actuates the electrical switch by either a cocking of the trigger on the posts or a translational movement thereon.

2. A switch actuating means including a supporting structure, a switch mounted generally centrally on said supporting structure, spaced apart posts on each side of said supporting structure on each side of said switch, a trigger member having spaced openings therein for concurrent loose sliding engagement with said spaced apart posts, separate means removably positioned beneath each end of said trigger member for holding each end of said trigger member against switch actuation, and a coil spring on each of said spaced apart posts normally urging both ends of said trigger member to switch actuation in the event either or both means removably positioned beneath the trigger member is removed whereupon the trigger member may move translationally or may cock at either of opposite angles to actuate the switch.

References Cited in the file of this patent

UNITED STATES PATENTS

| 487,519 | Elliott | Dec. 6, 1892 |
| 851,506 | Everett | Apr. 23, 1907 |
| 1,612,486 | Borey | Dec. 28, 1926 |
| 2,208,721 | Demosthenes | July 23, 1940 |
| 2,640,893 | Stalzer | June 2, 1953 |

FOREIGN PATENTS

| 528,195 | France | Aug. 11, 1921 |